(12) United States Patent
Lochkovic

(10) Patent No.: US 6,535,673 B1
(45) Date of Patent: Mar. 18, 2003

(54) OPTICAL FIBER ARRAYS HAVING AN INTERFACE CHARACTERISTIC

(75) Inventor: Gregory A. Lochkovic, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/538,710

(22) Filed: Mar. 30, 2000

(51) Int. Cl.[7] .................................................. G02B 6/44
(52) U.S. Cl. ........................................................ 385/114
(58) Field of Search ................................. 385/114, 115, 385/127, 128, 141, 147

(56) References Cited

U.S. PATENT DOCUMENTS

| | | | |
|---|---|---|---|
| 4,828,349 A | 5/1989 | Nakasuji ................. | 350/96.33 |
| 4,900,126 A | 2/1990 | Jackson et al. ......... | 350/46.23 |
| 5,524,164 A | 6/1996 | Hattori et al. ........... | 385/114 |
| 5,611,017 A | 3/1997 | Lee et al. ................ | 385/114 |
| 5,621,838 A | 4/1997 | Nomura et al. ......... | 385/100 |
| 5,636,308 A | 6/1997 | Personne et al. ........ | 385/102 |
| 5,761,363 A | 6/1998 | Mills ....................... | 385/114 |
| 5,881,194 A * | 3/1999 | Duecker .................. | 385/115 |
| 6,028,976 A | 2/2000 | Sato et al. ............... | 385/114 |

FOREIGN PATENT DOCUMENTS

| | | |
|---|---|---|
| DE | 4211488 A1 | 4/1992 |
| EP | 0822432 A1 | 2/1998 |
| EP | 0843187 A1 | 5/1998 |
| EP | 0856761 A1 | 8/1998 |
| EP | 0889344 A1 | 1/1999 |
| EP | 0926524 A1 | 6/1999 |

* cited by examiner

*Primary Examiner*—Khiem Nguyen
(74) *Attorney, Agent, or Firm*—Timothy J. Aberle

(57) ABSTRACT

An optical fiber array (20) comprising at least one subunit (26) including at least one optical fiber (22) therein surrounded by a respective subunit matrix (23). The optical fiber array (20) includes a common matrix (24) disposed adjacent to the at least one subunit (26). The optical fiber array (20) can include an interfacial zone (28) between the subunit and common matrices defined by an adhesion treatment, the adhesion treatment comprising at least one interfacial substance having an interface characteristic in a range from an essentially non-coupled relationship to a loose bond.

21 Claims, 2 Drawing Sheets

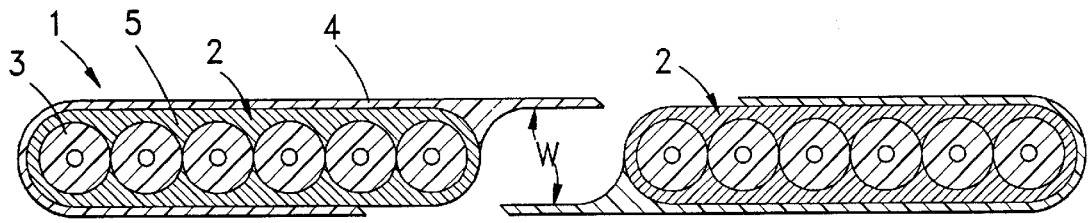
(PRIOR ART)
Fig. 1
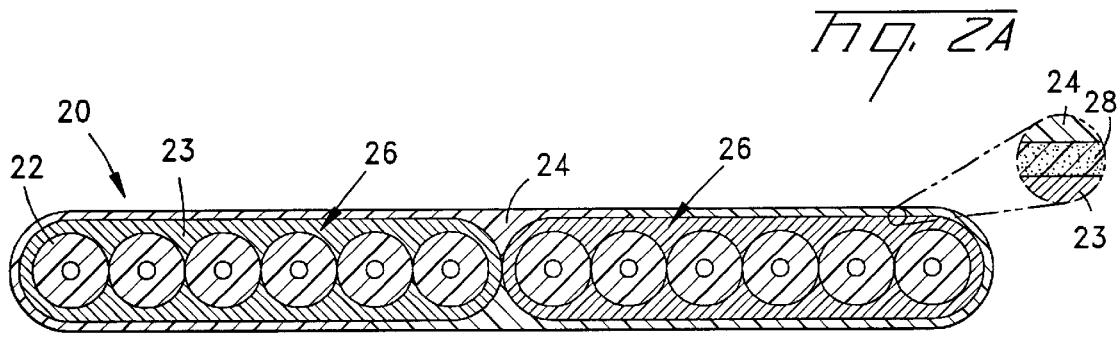
Fig. 2A
Fig. 2

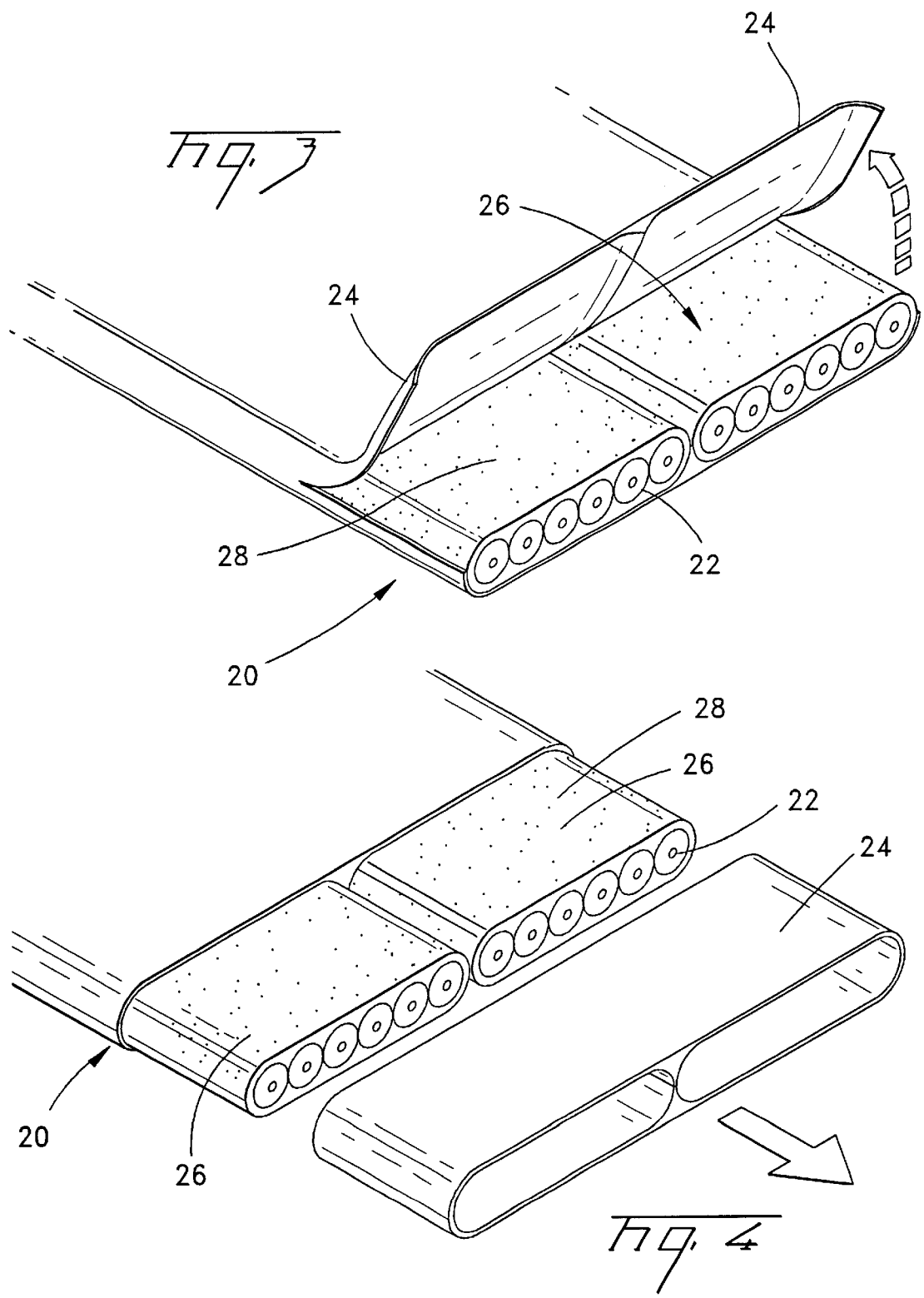

OPTICAL FIBER ARRAYS HAVING AN INTERFACE CHARACTERISTIC

The present invention relates to arrays of optical fibers and, more particularly, to optical fiber ribbons.

General Construction of an Optical Fiber Ribbon

Optical fiber ribbons are used to transmit telecommunication, computer, and data information. The general structure of an optical fiber ribbon, and the materials and processing variables applied in the manufacture of an optical fiber ribbon can play a significant role in how an optical fiber ribbon will perform in the field. Optical fiber ribbon structures can be generally classified into two general categories, namely, ribbons without subunits and ribbons including subunits. A ribbon/subunit design typically includes a subunit with at least one optical fiber surrounded by a subunit matrix that, in turn, is surrounded by a common matrix that also surrounds at least one other subunit.

An optical fiber ribbon without subunits can present problems for the craft. For example, when separating optical fiber ribbons that do not contain subunits into optical fiber subsets, the craft must use expensive precision tools. Moreover, connectorization/splice procedures can require inventories of specialized splice and closure units/tools for the various subsets of optical fibers. Where the craft elects to separate the optical fiber ribbon into subsets by hand, or with a tool lacking adequate precision, stray optical fibers can result. Stray optical fibers can cause problems in optical ribbon connectorization, organization, stripping, and splicing.

An exemplary optical fiber ribbon 1 is shown in FIG. 1. Optical fiber ribbon 1 includes subunits 2 having optical fibers 3 disposed in a subunit matrix 5 and surrounded by a common matrix 4. Optical fiber ribbons having subunits can have several handleability advantages, for example, improved separation, and avoidance of stray fiber occurrences. However, one handling concern is the potential formation of wings W (FIG. 1) during hand separation of the subunits. This can be caused by a lack of sufficient adhesion between common matrix 4 and subunit matrix 5. The existence of wings W can negatively affect, for example, optical ribbon organization, connectorization, stripping, and splicing operations by the craft. Additionally, wings W can cause problems with ribbon identification markings, or compatibility of the subunit with ribbon handling tools, for example, thermal strippers, splice chucks, and fusion splicers.

UV Materials in Ribbon Construction

Organic materials of the ultra-violet light curable (UV curable) type, and visible light curable type, have been developed for use as a base resin for subunit and common matrices. UV curable materials are generally tough, exhibit high resistance to abrasion, perform well when under stress, and are adaptable to mass production processes. When cured, a UV curable subunit matrix typically has a modulus of about $10^9$ Pa, and a UV curable common matrix typically has a relatively lower modulus of about $10^7$–$10^9$ Pa.

Review of UV Curing Process in Ribbon Manufacture

The curing of a UV radiation-curable composition suitable for use as a subunit or common matrix material is essentially a polymerization of the UV curable material, whereby the material undergoes a transition from a liquid to a solid. Prior to application to an optical fiber or a subunit, the UV curable material comprises a mixture of formulations of liquid monomers, oligomer "backbones" with, e.g., acrylate functional groups, photoinitiators, and other additives. Photoinitiators function by: absorbing energy radiated by the UV or visible light source; fragmenting into reactive species; and then initiating a polymerization/hardening reaction of the monomers and oligomers. The result is, in general, a solid network of crosslinking between the monomers and oligomers that may include fugitive components after cure. The photoinitiator therefore begins a chemical reaction, that promotes the solidification of the liquid matrix to form a generally solid film having modulus characteristics.

A key to the curing process is the reaction of a photoinitiator in response to UV radiation. A photoinitiator has an inherent absorption spectrum that is conveniently measured in terms of absorbance as a function of the wavelength of the radiated light. Each photoinitiator has a characteristic photoactive region, i.e., a photoactive wavelength range (typically measured in nanometers (nm)). Commercially available photoinitiators may have a photoactive region in the vacuum ultra-violet (VUV) (160–220 nm), ultra-violet (UV) (220–400 nm), or visible light (V-light) (400–700 nm) wavelength range. When the material is irradiated by a VUV, UV or V-light lamp, that emits light in the photoactive region, the material will cure.

In the application of a UV radiation curable material as a subunit or common matrix, light intensity and cure time are factors by which the resultant modulus of the film can be controlled. The light dose, i.e., the radiant energy arriving at a surface per unit area, is inversely proportional to line speed, i.e., the speed the radiation curable material moves under a radiation source. The light dose is the integral of radiated power as a function of time. In other words, all else being equal, the faster the line speed the higher the radiation intensity must be to achieve adequate curing. After a radiation curable material has been fully irradiated, the material is said to be cured. Curing occurs in the radiation curable material from the surface closest to the radiation source. The cured upper surface of the film can block light from reaching less cross-linked portions of the material beneath the surface. In this manner, a cure gradient may be established. Depending on the amount of incident light, a cured material may therefore exhibit different degrees of cure, and the degrees of cure across the depth profile a film can have distinct modulus characteristics associated therewith.

Thus the degree of cure affects the mechanical characteristics through the cross link density of the material. For example, a significantly cured material may be defined as one with a high cross link density for that material, and may, for example, be too brittle. Further, an undercured material may be defined as one having a low cross link density, and may be too soft, possibly causing an undesirable level of ribbon friction.

Optical fiber ribbons with subunits and a common matrix with general modulus characteristics may define a backdrop for the present invention. For example, EP-A-856761 discloses a ribbon having a common matrix surrounding discrete single-fiber optical subunits each including a respective subunit matrix. Each subunit matrix includes six tension wires formed of aramid fiber, glass fiber, or steel. The modulus of the common matrix can be set lower than that of the subunit matrix. This design is disadvantageous because the tension wires are expensive, add thickness and stiffness to the ribbon as a whole, and can present significant manufacturing difficulties. Moreover, single-fiber subunits have limited transmission capabilities.

In addition to surrounding single-fiber subunits, the common matrix can have a high modulus thereby defining a relatively rigid protective outer layer. For example, EP-A-843187 discloses a ribbon having a multi-layer common matrix with an outer protective layer. The layers of the common matrix have differing rigidness characteristics. The common matrix can have a modulus of 5 to 100 kg/mm$^2$, and the subunit resin layer can be the same material as the common matrix. A rigid outer layer is also discussed in an International Wire & Cable Symposium paper entitled "ANALYSIS OF A MODULAR 24-FIBER RIBBON FOR THE DISTRIBUTION NETWORK" (1998). The ribbon discussed therein includes a pair of subunits surrounded by a common matrix. The common matrix is more rigid than the subunit matrix for strengthening the structure of the ribbon. In addition, protective matrix layers with a relatively high modulus are disclosed in JP-A-80-62466 and JP-A-91-13773.

Moreover, the common matrix can exhibit predefined friction characteristics. For example, EP-A-822432 discloses a pair of subunits surrounded by a common matrix including a base resin material having a functional group of low compatibility dispersed therein. The functional group forms discrete domains of about 5 microns in diameter in the common matrix. The domains have a low modulus relative to the base resin of the common matrix for lowering the coefficient of friction (COF) of the common matrix. Another example of a COF effect is disclosed in U.S. Pat. No. 5,524,164, wherein part of the optical fiber ribbon includes a component of poor compatibility forming a discontinuous phase having a low modulus in the outer resin layer surrounding a pair of subunits. The component of poor compatibility is intended to migrate to the ribbon outer surface for reducing sliding friction.

SUMMARY OF THE INVENTION(S)

One aspect of the present invention involves an optical fiber array comprising at least one subunit including at least one optical fiber therein surrounded by a respective subunit matrix. A common matrix is disposed adjacent to the at least one subunit, and an interfacial zone between said subunit and common matrices is defined by an adhesion treatment, the adhesion treatment comprising at least one interfacial substance having an interface characteristic in a range from an essentially non-coupled relationship to a loose bond so that the common matrix can be removed from the subunit matrix intact leaving unbound subunits.

Another aspect of the invention relates to a method of manufacturing an optical fiber array comprising the steps of:
(a) supplying at least one subunit including at least one optical fiber therein surrounded by a respective subunit matrix;
(b) creating a common matrix adjacent to the at least one subunit; and
(c) forming an interfacial zone between the common and subunit matrices by application of an adhesion treatment, the adhesion treatment comprising at least one interfacial substance having an interface characteristic in a range from an essentially non-coupled relationship to a loose bond so that the common matrix can be removed from the subunit matrix intact leaving unbound subunits.

BRIEF DESCRIPTION OF THE DRAWING FIGURES

FIG. 1 is a cross sectional view of an optical fiber ribbon according to the background.

FIG. 2 is a cross sectional view of an optical fiber ribbon according to the present invention.

FIG. 2A is a close-up view of an interfacial zone according to the present invention.

FIG. 3 is an isometric view of a portion of a common matrix being removed from optical fiber subunits according to the present invention.

FIG. 4 is an isometric view of a common matrix being wholly removed from optical fiber subunits according to the present invention.

DETAILED DESCRIPTION OF THE INVENTION

The concepts of the present invention can be used to manufacture arrays of optical fibers arranged together, for example, generally planar optical fiber ribbon 20 (FIG. 2). Optical fiber ribbon 20 includes completely overcoated subunits. Optical ribbon 20 is preferably robust to cable processing, and preferably includes a low attenuation increase after cabling operations. In addition, optical ribbon 20 is preferably robust to handling by the craft, including consistent separability by hand or tool into optical fiber sub-units and the avoidance of stray fibers or wings.

Exemplary optical fiber ribbon 20 includes respective optical fibers 22. FIG. 2 shows the optical fiber ribbon with six optical fibers per subunit; however, optical fiber ribbons can be prepared with any number of optical fibers therein, for example, thirty-six optical fibers or more. A preferred optical fiber 22 includes a silica-based core that is operative to transmit light and is surrounded by a silica-based cladding having a lower index of refraction than the core. A soft primary coating surrounds the cladding, and a relatively rigid secondary coating surrounds the primary coating. Optical fibers 22 can be, for example, single mode or multi-mode optical fibers made commercially available by Corning Incorporated.

Optical fiber ribbon 20 includes subunits 26 each having respective subunit matrix layers 23 in which optical fibers 22 are disposed. A common matrix 24 surrounds each subunit 26 (FIG. 2). As further described below, interfacial zones 28 are defined between the subunit and common matrices 23,24 (shown schematically in FIG. 2A).

In general, subunits 26 can be made by arranging optical fibers 22 generally in parallel and extruding a UV curable, subunit matrix material therearound and curing it with a UV radiation source. Next, a UV curable common matrix 24 is extruded around and circumscribes subunits 26 thereby defining optical fiber ribbon 20. Common matrix 24 can be cured with a UV radiation source. The UV radiation source may be an H or a D bulb: an H bulb is preferred for establishing a cure gradient and better peelability, and a D bulb is preferred where it is desired to have minimum cure gradient. In a preferred embodiment, the respective formulations of common matrix 24 may comprise a UV curable acrylate material including a photoinitiator.

Alternatively, common matrix 24 can include a photoinitiator having a photoactive peak absorbance in the relatively long wavelength UV spectrum. For example, common matrix layer 24 can include one or more photoinitiators having an alpha-hydroxy-ketone material and a phenyl phosphine oxide derivative, for example, DAROCURE 4265 (HMPP/TPO) (270–290 nm), made commercially available by Ciba, or another suitable photoinitiator.

Additionally, for enhancing strippabilty/peelability of subunit matrix 23 with respect to optical fibers 22, optical fiber ribbons 20 may include respective release layers (not shown) between optical fibers 22 and subunit matrix 23, for example, as disclosed in U.S. Pat. No. 4,900,126, which is hereby incorporated by reference herein in its entirety. The thickness of common matrix 24 is up to about 100 µm or more with a preferred range of about 5 µm to 20 µm, as disposed over a subunit thickness of about 2 µm to about 75 µm or more. Optical fiber ribbons made in accordance with the present invention preferably have a controlled common matrix modulus of about 1,000 MPa or more.

In addition to modulus characteristics, common matrix 24 exhibit good friction characteristics. A suitable UV curable material minimizes the static COF ($\mu_{static}$) of the common matrix in order to reduce stress induced attenuation caused by subunit separation with a tool. The optimal $\mu_{static}$ range is less than or equal to about 1.0. Further, ribbon matrix 23 can include an additive for reducing COF, such as is disclosed in commonly assigned U.S. Pat. No. 5,561,730, which is incorporated by reference herein in its entirety. U.S. Pat. No. 5,561,730 also discloses a suitable method for determining the value of $\mu_{static}$.

Several methods according to the present invention can be used to define interfacial zone 28, shown schematically in FIG. 2A, between subunit matrix 23 and common matrix 24. For example, on a molecular level, interfacial zone 28 can be formed by application of an adhesion treatment and subsequent application and curing of common matrix 24. The function of interfacial zone 28 is to establish a controlled adhesion between the common and subunit matrices.

The controlled adhesion is preferably robust enough to inhibit inadvertent separation and the formation of wings during subunit separation. On the other hand, the controlled adhesion is delimited so as to avoid breakage of any subunit matrix during subunit separation, thereby avoiding the formation of stray fibers.

In accordance with an aspect of the present invention, adhesion zone 28 can comprise an adhesion treatment including at least one interfacial substance. The interfacial substance results in an interface characteristic, between the common matrix and the subunit matrix, in a range from a preferred essentially non-coupled relationship 0–1 gf (grams-force) to a less preferred loose bond 1–10 gf. For example, to define an essentially non-coupled interface characteristic, the interfacial substance most preferably comprises a significant amount of a liquid or semi-liquid material, for example, a TEFLON, silicone and/or mineral oil, fatty acid compounds or derivatives, e.g., glycerol mono-stearate or stearic acid. In addition, the essentially non-coupled interface characteristic can be defined by application of a reactive site neutralizing agent, for example, an acid monomer comprising acrylic or methacrylic acid glacial in combination with cationic matrix formulations that neutralize the generally caustic cationic UV curable material of the subunit matrix. Preferably, the neutralizing agent is applied wet-on-wet over the subunit matrix. The reactive site neutralizing agent is functional to partially or substantially eliminate chemical bonding between the common and subunit matrices so that chemical bonding at the interface is wholly suppressed or inhibited. Also, the acid monomer can be used to neutralize matrix formulations using benzophenone/amine photoinitiator systems whereby the amines are neutralized.

Alternatively, the essentially non-coupled relationship can be defined by interfacial zone 28 comprising a medial element applied to the outer surface matrix of a subunit prior to application of the common matrix coating. The medial element can be, for example: Mylar; plastic extruded or applied as a tape; paper; a water swellable tape to inhibit water penetration; a thin metallic foil, e.g., aluminum or copper; fibers or yarns, e.g., aramid, fiber glass, or propylene that can provide a tensile character as well as a cushioning effect. To achieve a loose bond interface characteristic, the interfacial substance can include, for example, talc, TEFLON and derivatives thereof including TEFLON wax, silicone gel spheres, graphite, or a fatty amide wax.

Where the interfacial substance comprises particulate matter, the particles can be applied electrostatically to a subunit matrix. The adhesion treatment is preferably applied to subunits 26 in a very thin, evenly distributed layer, and/or is formulated into either or both of the common coating or subunit matrices. To achieve a desired interface characteristic the adhesion treatment can be a mixture of one or more interfacial substances. One or more interfacial substances can be combined with a carrier material, for example, a UV curable acrylate material.

The adhesion treatment can be applied with a die, wiped on, applied as a mist, or applied by any other appropriate method onto subunits 26. The adhesion treatment can be partially or completely cured with a UV light source prior to application of the common matrix. Preferably the adhesion treatment forms a thickness of about 5 µm or less. The adhesion treatment can be applied in-line with application of the common matrix material; however, it is contemplated that the adhesion treatment can be applied in an off-line process as well.

In view of the foregoing and in general, a method of manufacturing an optical fiber array comprises the steps of:
(a) supplying at least one subunit including at least one optical fiber therein surrounded by a respective subunit matrix;
(b) creating a common matrix adjacent to the at least one subunit; and
(c) defining an interfacial zone between the common and subunit matrices defined by an adhesion treatment, the adhesion treatment comprising at least one interfacial substance having an interface characteristic in a range from an essentially non-coupled relationship to a loose bond.

The step of defining the interfacial zone preferably includes applying and possibly partially or fully curing the adhesion treatment, and subsequent application and curing of the common matrix. According to the present invention, the common matrix can be removed from the subunit matrix intact leaving unbound subunits by peeling away the common matrix (FIG. 3) or by cutting and sliding the matrix off (FIG. 4).

The present invention has thus been described with reference to the foregoing embodiments, which embodiments are intended to be illustrative of the inventive concepts rather than limiting. Skilled artisans will appreciate that variations and modifications of the foregoing embodiments may be made without departing from the scope of the appended claims. For example, the inventive concepts can encompass non-planar optical fiber arrays, for example, a low modulus matrix in a cylinder such as a blown fiber subunit. Additionally, the optical fiber array can be, for example, a bundle of optical fibers connected by a subunit matrix and surrounded by a common matrix according to the present invention. In another contemplated variation, UV curable acrylates carriers can be replaced by thermoplastics including, for example, PVC, PE, SEBS, and/or PP. The present inventive concepts can be used in the formation of ribbon stacks so that two or more optical fiber ribbons in a stack share an interface characteristic, between the respective common and/or subunit matrix coatings of the ribbons, in a range from an essentially non-coupled relationship to a loose bond.

Accordingly, what is claimed is:

1. An optical fiber array comprising:
   at least one subunit including at least one optical fiber therein surrounded by a respective subunit matrix;
   a common matrix disposed adjacent to the at least one subunit having a controlled common matrix modulus of about 1,000 MPa or more; and
   an interfacial zone between said subunit and common matrices defined by an adhesion treatment, the adhesion treatment comprising at least one interfacial substance having an interface characteristic in a range from an essentially non-coupled relationship to a loose bond whereby the common matrix can be removed from the subunit matrix intact leaving unbound subunits.

2. The optical fiber array of claim 1, the interfacial substance comprising a liquid or a semi-liquid substance.

3. The optical fiber array of claim 1, the interfacial substance being selected from the group consisting of a TEFLON, silicone and/or mineral oil, and fatty acid compounds.

4. The optical fiber array of claim 1, the interfacial substance comprising a reactive site neutralizing agent.

5. The optical fiber array of claim 4, the reactive site neutralizing agent comprising an acid monomer.

6. The optical fiber array of claim 1, the interfacial substance comprising a medial element.

7. The optical fiber array of claim 6, the medial element being selected from the group consisting of tape, paper, water swellable tape, metallic foil, fibers, and yarns.

8. The optical fiber array of claim 1, the medial element being selected from the group consisting of talc, TEFLON, TEFLON wax, silicone gel spheres, graphite, or a fatty amide wax.

9. The optical fiber array of claim 6, the medial element being tape or paper.

10. The optical fiber array of claim 6, the medial element being a water swellable tape or metallic foil, fibers, or yarns.

11. The optical fiber array of claim 6, the medial element being an oil.

12. The optical fiber array of claim 6, the medial element being TEFLON or talc.

13. The optical fiber array of claim 6, the medial element being silicone, gel, spheres or graphite.

14. A method of manufacturing an optical fiber array comprising the steps of:
    (a) supplying at least one subunit including at least one optical fiber therein surrounded by a respective subunit matrix;
    (b) creating a common matrix adjacent to the at least one subunit; and
    (c) defining an interfacial zone between the common and subunit matrices defined by an adhesion treatment, the adhesion treatment comprising at least one interfacial substance having an interface characteristic in a range from an essentially non-coupled relationship to a loose bond, whereby the common matrix can be removed from the subunit matrix intact leaving unbound subunits.

15. The method of claim 14, the step of defining said interfacial zone including application of a liquid or semi-liquid substance to said subunit matrix.

16. The method of claim 14, the step of defining said interfacial zone including application of an interfacial substance selected from the group consisting of a TEFLON, silicone and/or mineral oil, and fatty acid compounds.

17. The method of claim 14, the step of defining said interfacial zone including application of an interfacial substance comprising a reactive site neutralizing agent that neutralizes at least some reactive sites in the subunit matrix.

18. The method of claim 17, the reactive site neutralizing agent comprising an acid monomer.

19. The method of claim 14, the step of defining said interfacial zone including application of an interfacial substance comprising a medial element.

20. The method of claim 19, the medial element being selected from the group consisting of tape, paper, water swellable tape, metallic foil, fibers, and yarns.

21. The method of claim 14, the step of defining said interfacial zone including application of an interfacial substance selected from the group consisting of talc, TEFLON, TEFLON wax, silicone gel spheres, graphite, or a fatty amide wax.

* * * * *